United States Patent [19]
Frank et al.

[11] Patent Number: 5,277,436
[45] Date of Patent: Jan. 11, 1994

[54] COMBINATION HAND TRUCK AND STAIR RAMP

[75] Inventors: John H. Frank, Providence; Victor Rocha, East Providence, both of R.I.

[73] Assignee: Magline, Inc., Pinconning, Mich.

[21] Appl. No.: 899,478

[22] Filed: Jun. 16, 1992

[51] Int. Cl.⁵ .......................... B62B 5/02; B62B 5/04; B62B 1/10

[52] U.S. Cl. .................. 280/5.2; 280/47.27; 188/30; 188/31; 14/69.5

[58] Field of Search ................. 280/5.2, 47.27, 47.28, 280/47.29, 5.24, 7.14; 188/30, 31, 82.7; 14/69.5, 71.1, 73.5

[56] References Cited

U.S. PATENT DOCUMENTS

| | | |
|---|---|---|
| 271,152 | 1/1883 | Strugnell .................. 280/47.27 X |
| 571,705 | 11/1896 | Thomas .................... 280/47.29 |
| 902,794 | 11/1908 | Anderson ............... 280/47.27 X |
| 981,613 | 1/1911 | Carter . |
| 1,137,645 | 4/1915 | McCormick .................. 14/69.5 |
| 1,194,819 | 8/1916 | Clark . |
| 2,559,712 | 7/1951 | Dobbs ...................... 14/71.1 X |
| 2,633,363 | 3/1953 | Marshall ............... 280/47.27 X |
| 2,733,074 | 1/1956 | Fuglie et al. ................ 280/5.2 |
| 2,779,958 | 2/1957 | Hodges et al. . |
| 2,823,921 | 2/1958 | Lagaard ...................... 280/5.2 |
| 3,009,183 | 11/1961 | Lay . |
| 3,532,058 | 10/1970 | Van der Meide ......... 280/47.27 X |
| 3,968,974 | 7/1976 | Wetzel .................... 280/47.27 |
| 3,984,891 | 10/1976 | Weinmann . |
| 4,528,711 | 7/1985 | Packer . |
| 4,853,999 | 8/1989 | Smith . |

FOREIGN PATENT DOCUMENTS

| | | | |
|---|---|---|---|
| 449360 | 9/1927 | Fed. Rep. of Germany ... 280/47.27 |
| 3443127 | 6/1986 | Fed. Rep. of Germany ....... 14/71.1 |
| 0018196 | 2/1978 | Japan ..................... 14/69.5 |
| 593830 | 10/1947 | United Kingdom ............ 280/47.27 |
| 1038445 | 8/1966 | United Kingdom . |

Primary Examiner—Brian L. Johnson
Attorney, Agent, or Firm—Learman & McCulloch

[57] ABSTRACT

In combination, a hand truck having a unidirectional wheel control ratchet and an adjustable length stair ramp are operable for transporting heavy loads of cargo up flights of stairs. A ratchet wheel and pawl assembly is attached to the wheels of the hand truck to limit the direction of rotation of the wheels to a backward rotation. The stair ramp includes two telescoping U-shaped ramp channels which are spaced so that the wheels of the hand truck can roll within the channels and the ramp further includes upper and lower footing cross members which are pivotally connected to the upper and lower ends of the ramp channels. When the ramp is in place on a flight of stairs the telescoping and pivoting qualities of the ramp allow the channels to rest on the apices of the stair steps. The wheel control ratchets permit a heavily loaded hand truck to be pulled up the stairs along the ramp channels without fear of the hand truck rolling forward and down the ramp.

5 Claims, 13 Drawing Sheets

COMBINATION HAND TRUCK AND STAIR RAMP

BACKGROUND OF THE INVENTION

The instant invention relates to the transportation of cargos up and down stairs and more specifically to a hand truck and stair ramp system for transporting heavy cargos up and down flights of stairs.

It has been found that most worker injuries resulting from the use of hand trucks on stairs are lower back injuries. These injuries are both acute (sudden trauma) and cumulative (repetitive trauma), although acute injuries are sometimes believed to be the final result of cumulative injuries. It has also been found that lower back injuries are responsible for approximately 35% of the injuries that occur in the work place, and that they are responsible for approximately 80% of the monetary costs and losses associated with work place injuries.

The ergonomic and physiological factors associated with lower back injuries include the following: elevated back compression forces, asymmetrical lifting, partially flexed trunk posture, high inertia forces, overloading, and fatigue. All of these factors are present and magnified in the typical methods of moving loaded hand trucks up and down flights of stairs.

To move a typical 180 pound load up a single step with a standard 25-30 pound hand truck, an operator must bend at the waist to lower the hand truck runners or "stair glides" into contact with the apex of the step and then pull the hand truck upwardly. Unfortunately, friction with the step apex often magnifies the necessary pulling forces, such that as much as 285 pounds of lifting force may be required to move a 180 pound load up a single step. Further, when a worker is pulling in the bent-over position, intervertebral compression can be elevated from a normal 120-150 pounds to as much as 600 pounds. Intervertebral compression above 500 pounds is believed to magnify the likelihood of injury by a multiple of 6. In any case, in order to move a hand truck up a step an operator must step up and back with one foot while preparing to pull the load up to the next succeeding step. As a result, in order to move a load up a flight of steps the load must be pulled repetitively in a sudden "jerking" motion to accomplish the task.

SUMMARY OF THE INVENTION

The instant invention provides, in combination, a hand truck having a unidirectional wheel control system and an adjustable length stair ramp.

Briefly, the hand truck comprises a hand truck frame having a pair of wheels attached thereto, and a unidirectional wheel control mechanism comprising a pair of ratchet wheels which are attached to the wheels of the hand truck, and a pair of selectively engageable ratchet pawls which are engageable with the teeth of the ratchet wheels for limiting the direction of rotation of the wheels to a backward direction and for thus limiting the hand truck to backward movement. When the pawls are not engaged the hand truck wheels turn freely in both directions, but in any case, the ratchet pawls are preferably controlled via conventional mechanical remote control means including levers, cables, and springs.

The adjustable length stair ramp comprises a pair of U-shaped, telescoping ramp channels which are maintained in spaced relation by upper and lower footing members that are pivotally connected to the upper and lower ends of the ramp channels. The lower footing member contacts the ground or floor at the base of the stairs, and the upper footing member contacts the upper platform of the stair flight. The telescoping quality of the adjustable length stair ramp allows it to accommodate stair flights of different numbers of stairs, and the pivoting attachment of the footings allows the ramp to accommodate stair flights of different angles of inclination. When the ramp is in place on a set of stairs the combined telescoping and pivoting qualities of the ramp allow it to rest on the apices of the stairs which facilitates support of heavy loads travelling over the ramp channels.

It has been found that the hand truck and ramp combination of the instant invention allows an operator to maintain a stable footing on the portions of the stair treads of a stairway which are exposed between the ramp channels while pulling the hand truck upwardly over the stairs spanned by the ramp channels. It has been further found that while pulling the hand truck upwardly, the wheel control ratchets effectively prevent the hand truck from rolling forward and back down the ramp due to gravitational forces.

Accordingly, it is an object of the instant invention to provide a hand truck and ramp system for transporting heavy cargo loads up a flight of stairs.

It is another object to provide a hand truck having a unidirectional wheel control system which limits the direction of rotation of the wheels of the hand truck to a backward rotation.

It is still another object to provide a hand truck and ramp system which is easy to set up and use.

It is an even further object to provide a hand truck and ramp system which significantly reduces the amount of stress on the lower back of an operator when transporting heavy loads of cargo up a flight of stairs.

A still further object is to provide a unidirectional wheel control mechanism for a hand truck which includes a pair of ratchet wheels attached to the wheels of the hand truck, and a pair of selectively engageable ratchet pawls for limiting the direction of rotation of the hand truck wheels to a backward direction.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
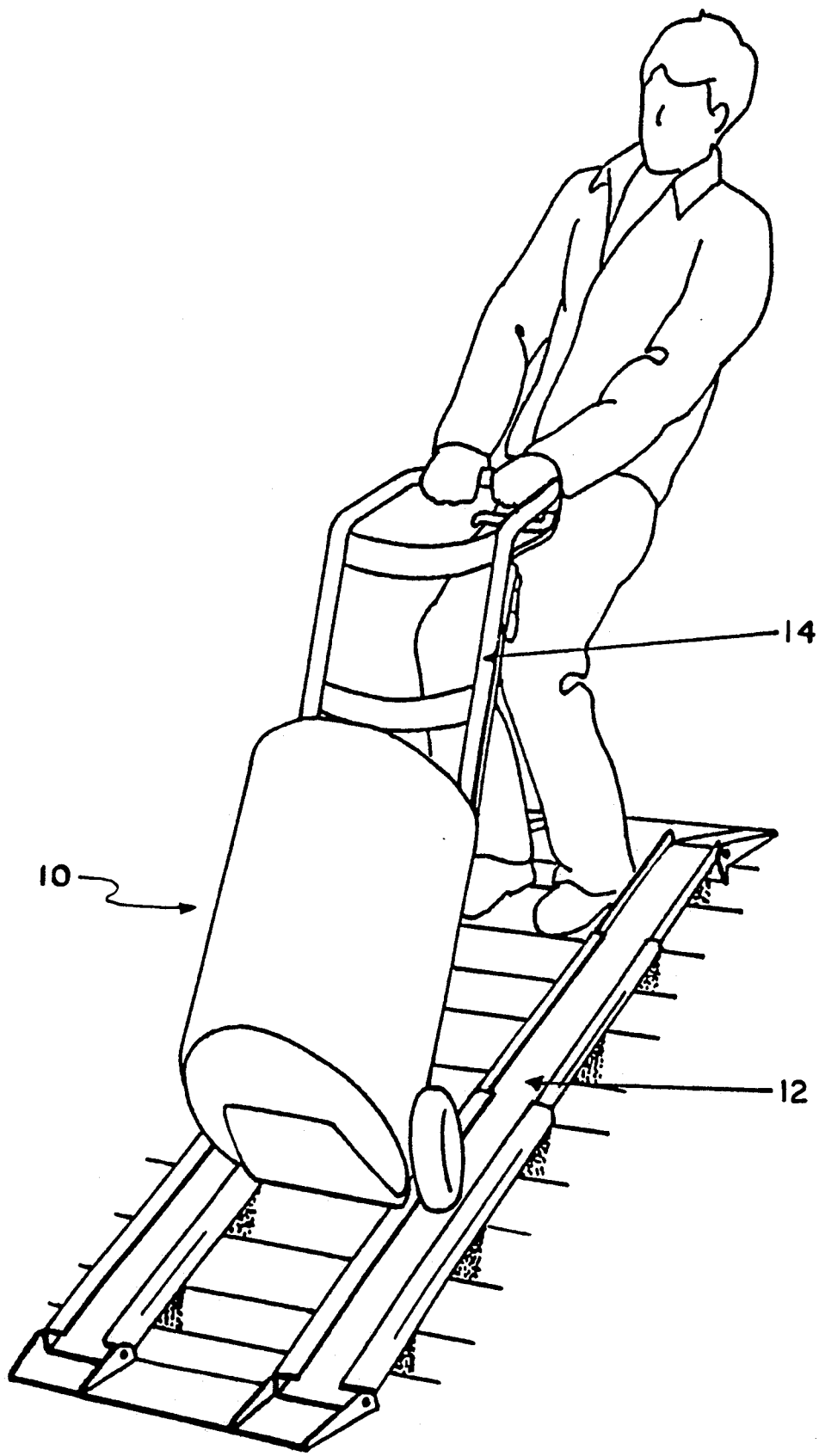
FIG. 1 is a perspective view of the hand truck and ramp system of the instant invention.
Figure 2:
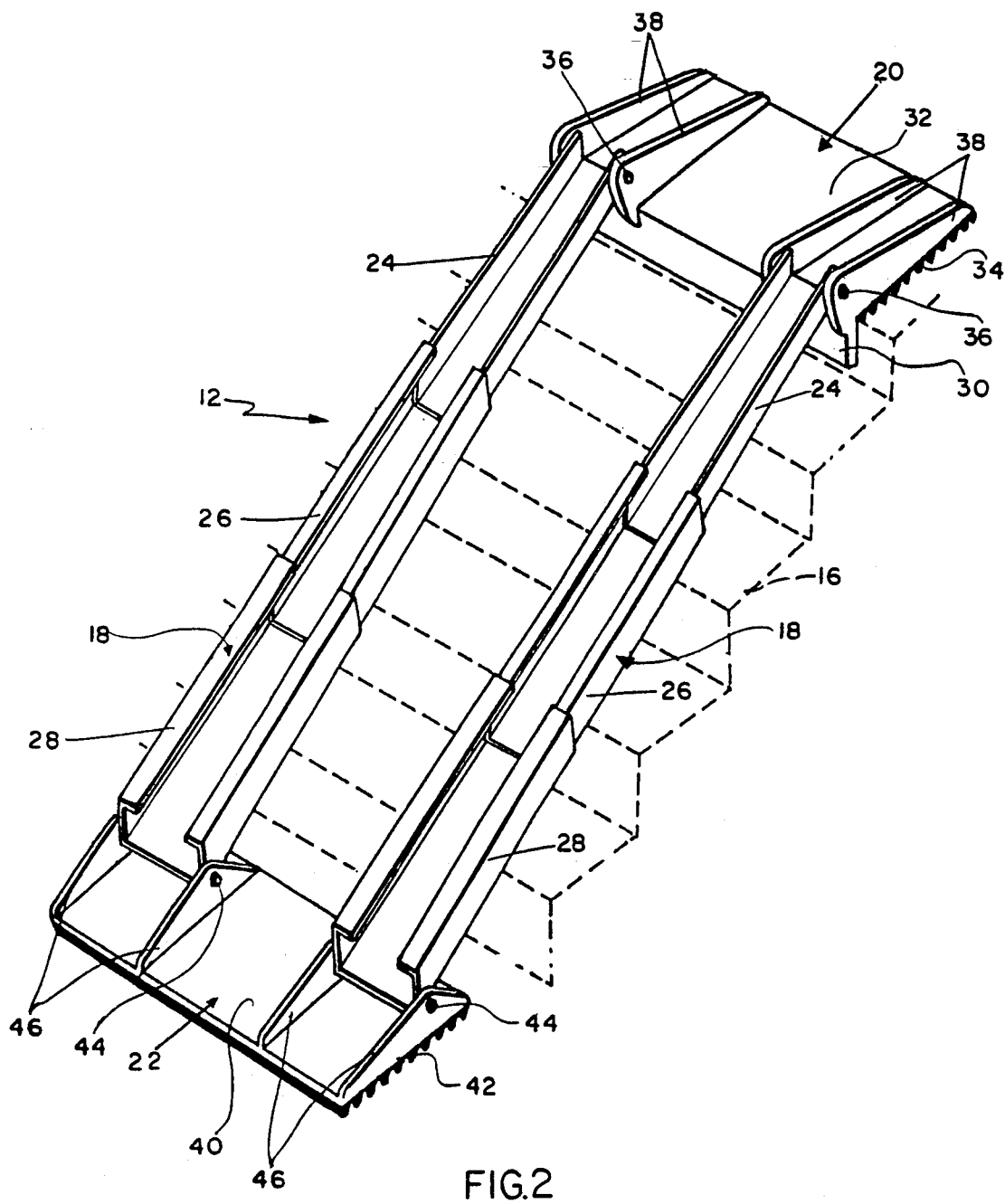
FIG. 2 is a perspective view of the adjustable length stair ramp of the instant invention.

Referring now to the drawings and particularly to FIG. 1, the hand truck and ramp system of the instant invention is illustrated and generally indicated at 10. The system 10 comprises an adjustable length stair ramp generally indicated at 12, and a modified hand truck generally indicated at 14, and, as illustrated in FIG. 2, the system 10 is adapted to be utilized for transporting cargo up and down a flight of stairs 16.

Referring to FIGS. 1 through 8, the ramp 12 comprises a pair of adjustable length ramp channels generally indicated at 18 which are connected at the upper and lower ends thereof by upper and lower crosstie footings generally indicated at 20 and 22, respectively. The ramp channels 18 each comprise an upper member 24, a middle member 26, and a lower member 28 which are slidably disposed in telescoping relation. The upper crosstie footing 20 comprises a vertical engagement portion 30, and a horizontal engagement portion 32, which are disposed at right angles to each other. In use, the vertical portion 30 is placed against the riser portion of the top step of a flight of stairs 16, and the horizontal portion 32 is received on the platform or floor of the top step. The horizontal portion 32 includes a non-slip pad 34 which comprises rubber or another similar material to prevent the ramp 12 from inadvertent sliding. The upper crosstie footing 20 is pivotally attached to the upper members 24 of the ramp channels 18 by bolts or pins 36, which extend through the side walls of the members 24 and through members or flanges 38 which extend upwardly from the crosstie footing 20. The upper crosstie footing 20 is, therefore, freely pivotable about an axis perpendicular to the longitudinal axis of the ramp channels 18. The lower crosstie footing 22 comprises a horizontal engagement plate 40, which is received on the floor at the base of the flight of stairs 16 when the ramp 12 is in use. The engagement plate 40 includes a non-slip pad 42 comprised of rubber or some other similar material, to further prevent inadvertent slipping of the ramp 12 when in use. The lower crosstie footing 22 is pivotally attached to the lower members 28 of the ramp channels 18 by bolts or pins 44, which extend through the side walls of the members 28 and through flanges 46 extending upwardly from the footing 22. The lower crosstie footing 22 is also freely pivotable about an axis perpendicular to the longitudinal axis of the ramp channels 18.

Figure 3:
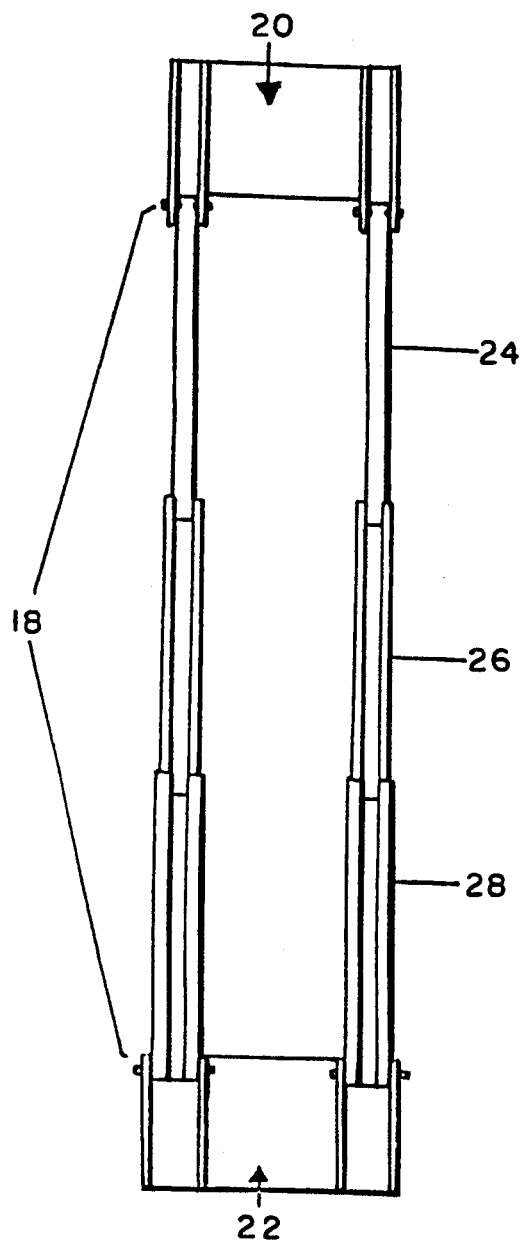
FIG. 3 is a top plan view of the stair ramp in an extended position.
Figure 4:
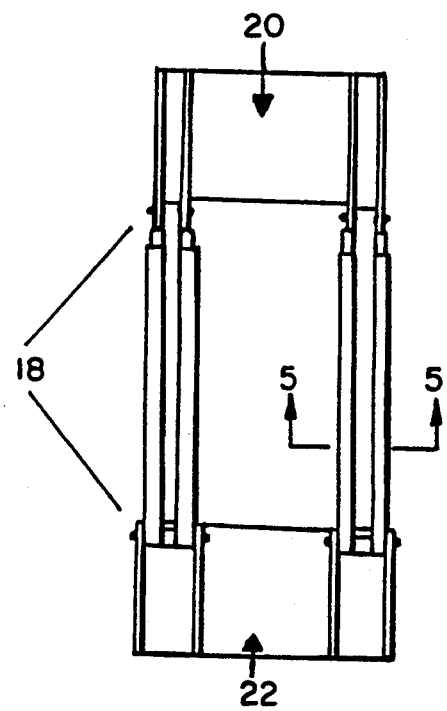
FIG. 4 is a similar view thereof in a contracted position.
Figure 5:
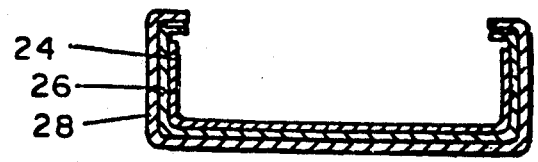
FIG. 5 is a cross-sectional view of one of the U-shaped ramp channels.
Figure 6:
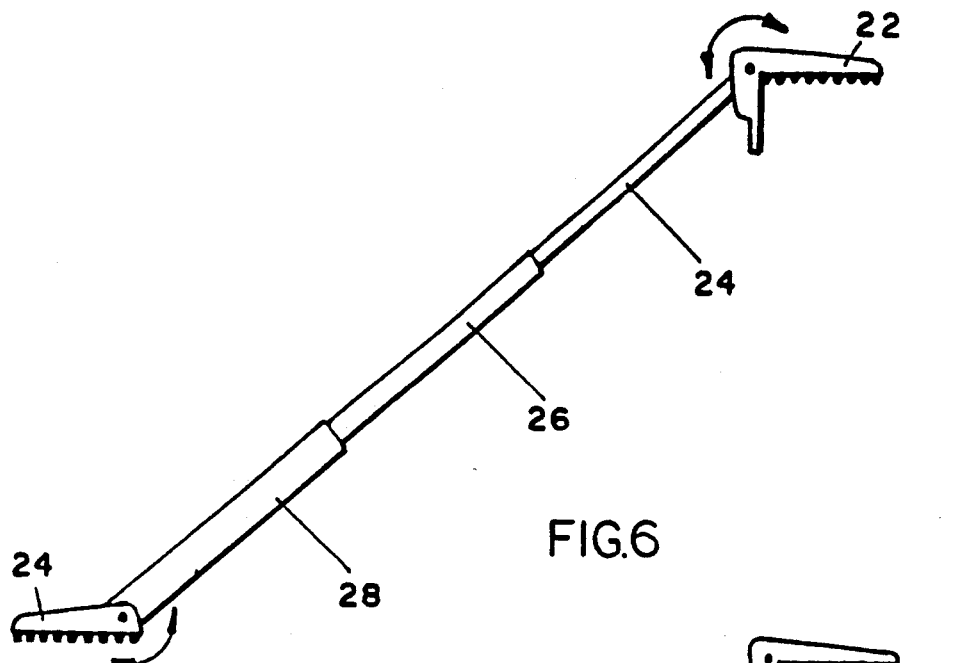
FIG. 6 is a side elevational view of the stair ramp in an extended position.
Figure 7:
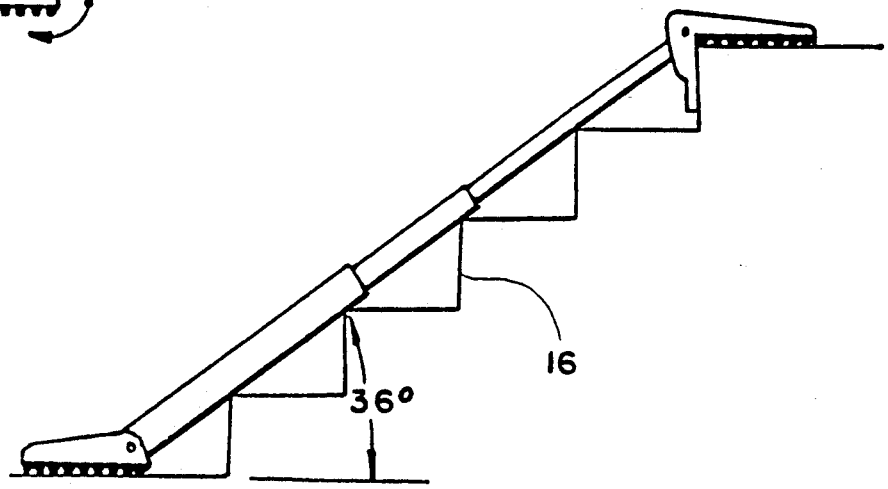
FIG. 7 is a similar view thereof with the stair ramp in position on a flight of stairs having a 36 degree incline.

The slidable telescopic relationship of the members 24, 26, and 28 of the ramp channels 18 is clearly illustrated by the extended view thereof, illustrated in FIG. 3 and the contracted view thereof illustrated in FIG. 4. Telescopic expansion is limited by stops (not shown), removable or spring-loaded pins (not shown), or other similar means well known in the art, which prevent the members 24, 26, and 28 from becoming disassembled from each other. Accordingly, the ramp structure 12 is effectively maintained in a single unit that is easy to transport.

Figure 8:
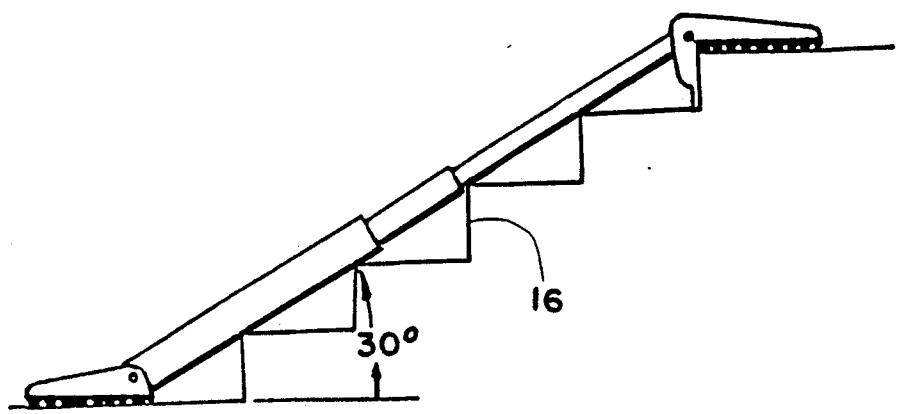
FIG. 8 is another similar view thereof with the stair ramp in position on a flight of stairs having a 30 degree incline.

Because the upper and lower footings 20 and 22 are freely pivotable, the ramp 12 can be securely placed in position upon a flight of stairs of any angle of inclination. This feature is clearly illustrated in FIGS. 6, 7, and 8, where the ramp is seen in various positions as supported on the apices of a flight of stairs having a 36 degree angle of inclination (FIG. 7), and a 30 degree angle of inclination (FIG. 8). When the ramp 12 is in place on a flight of stairs, the combined telescoping and pivoting qualities of the ramp allow it to rest on the apices of the individual stairs 16 so that it can more effectively support heavy loads travelling over the ramp channels 18.

Figure 9:
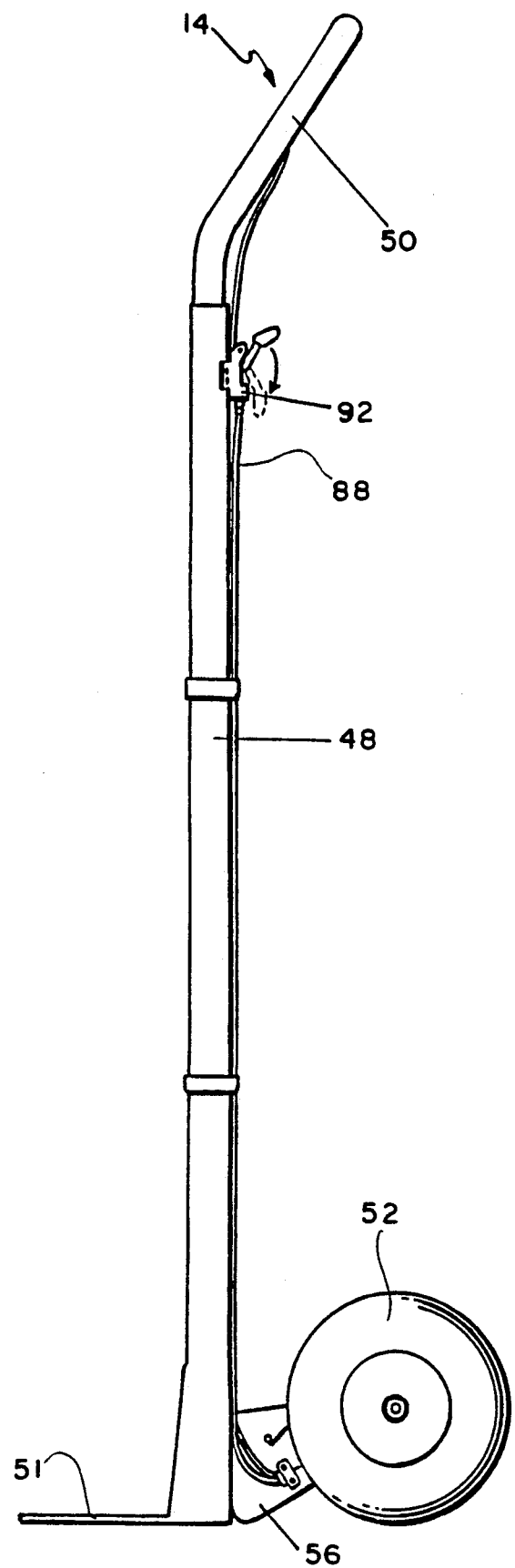
FIG. 9 is a side elevational view of the hand truck of the instant invention.
Figure 10:
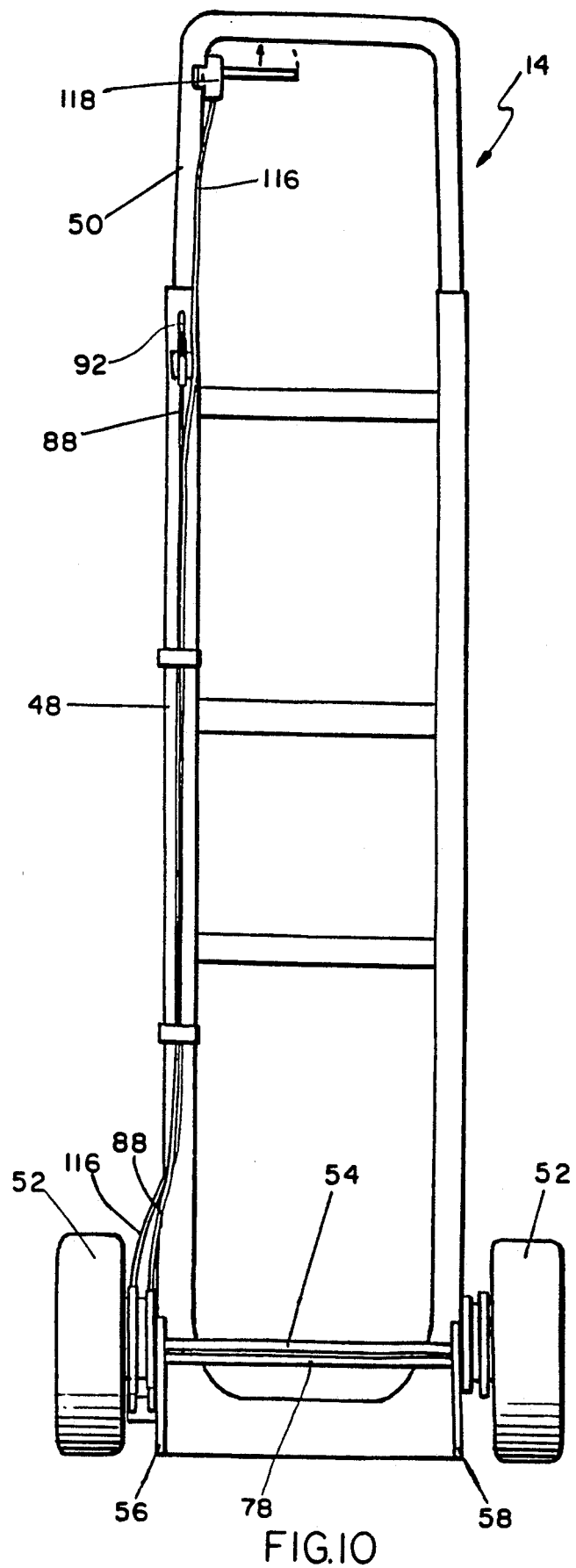
FIG. 10 is a rear elevational view thereof.
Figure 11:
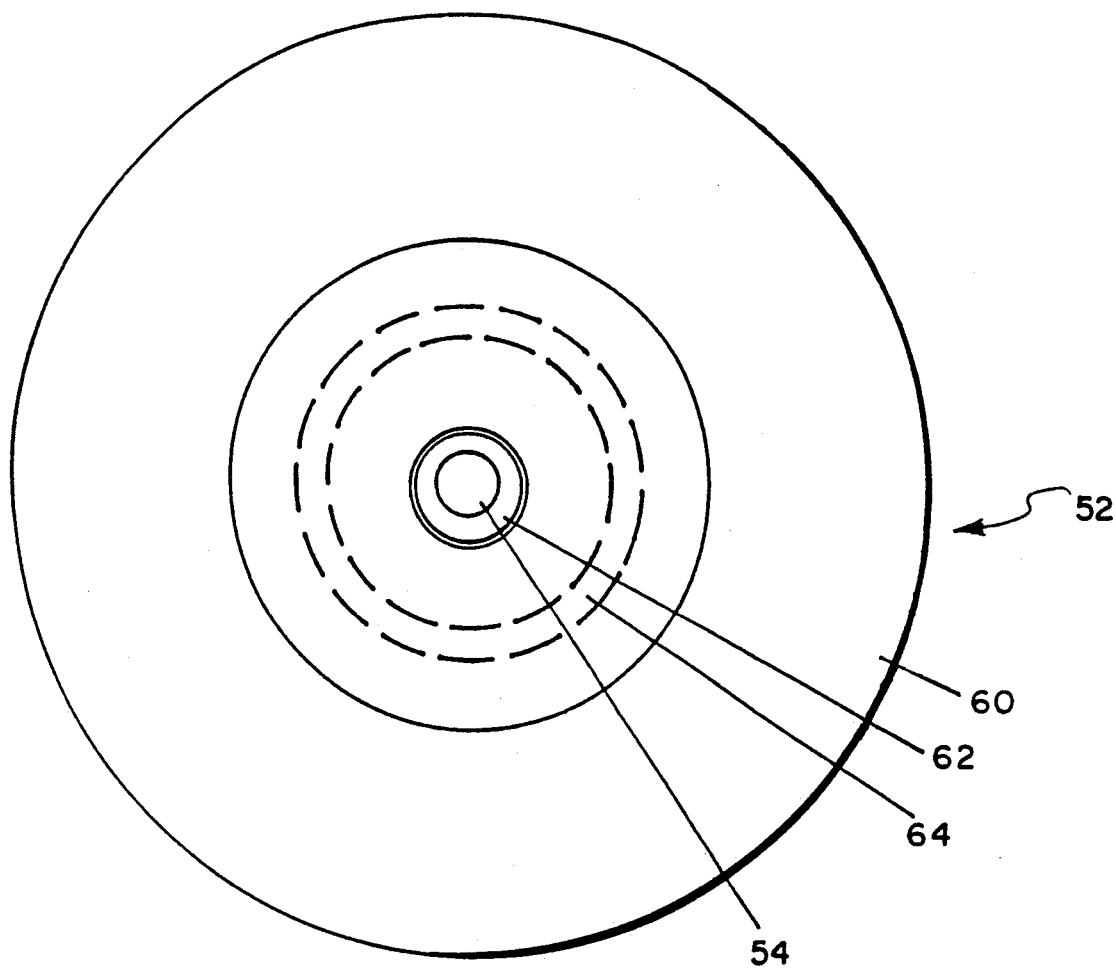
FIG. 11 is a side elevational view of one of the wheels thereof.
Figure 12:
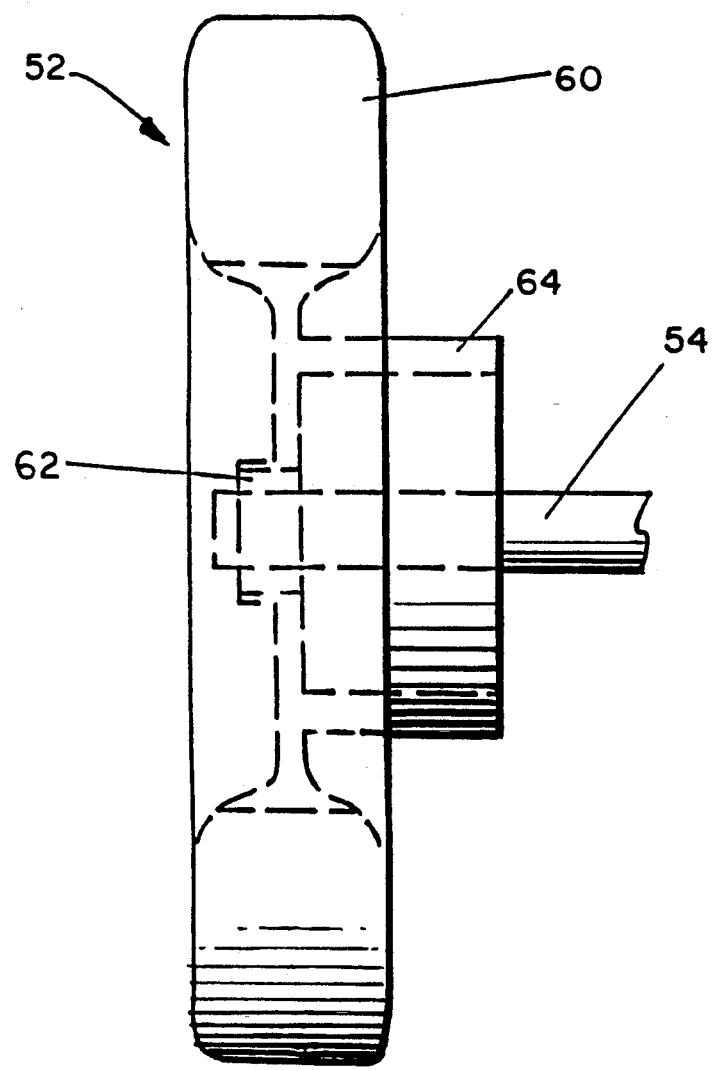
FIG. 12 is an end elevational view of one of the wheels.
Figure 13:
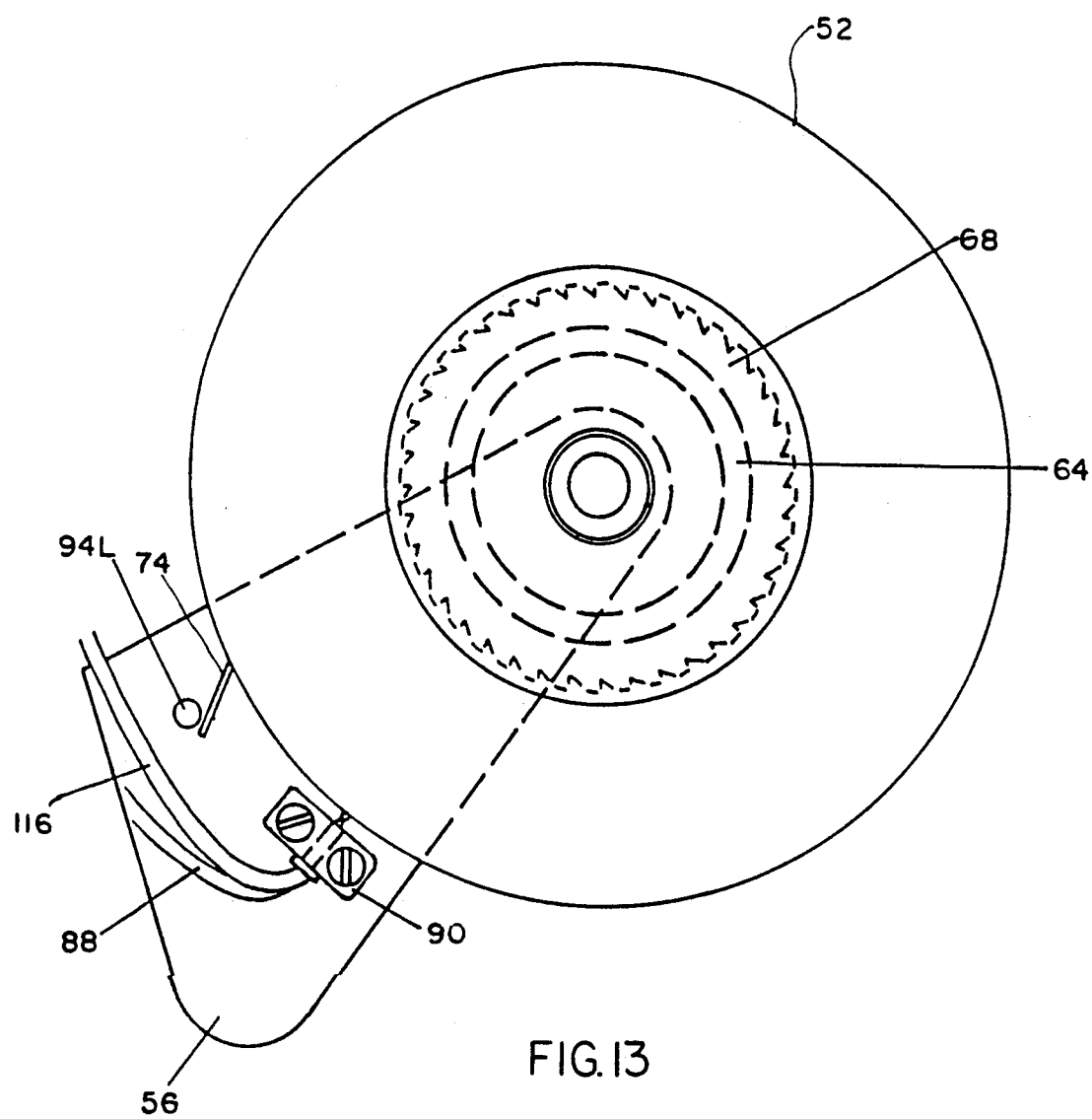
FIG. 13 is a left side elevational view of the left wheel bracket.
Figure 14:
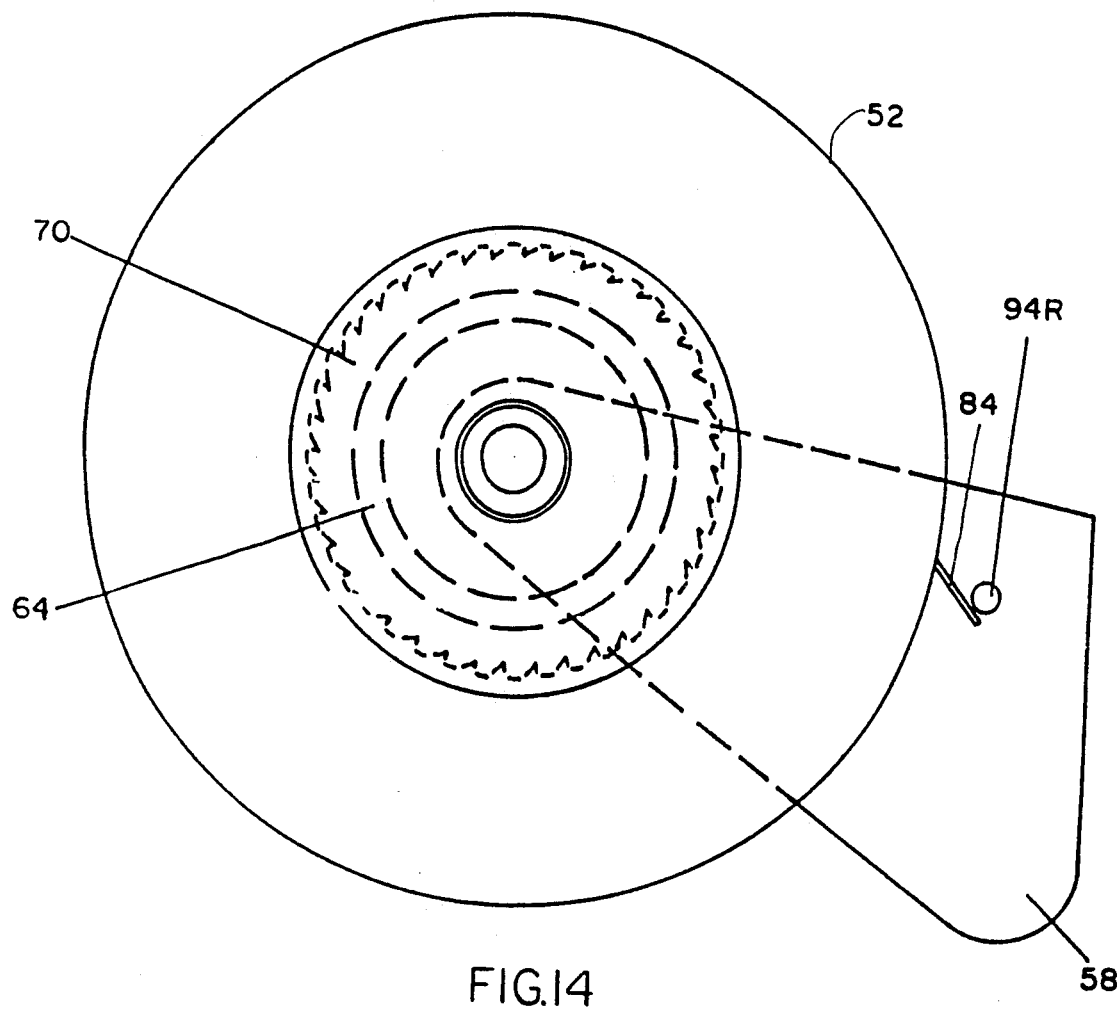
FIG. 14 is a right side elevational view of the right wheel bracket.
Figure 15:
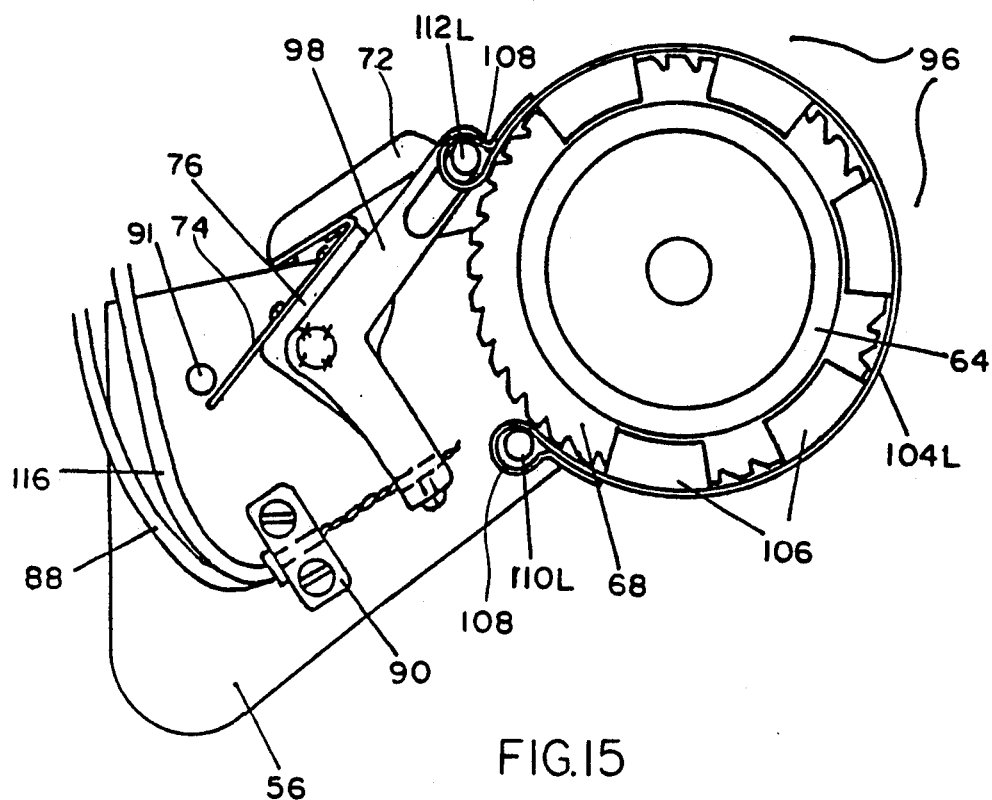
FIG. 15 is a left side elevational view of the left brake and ratchet assemblies.
Figure 16:
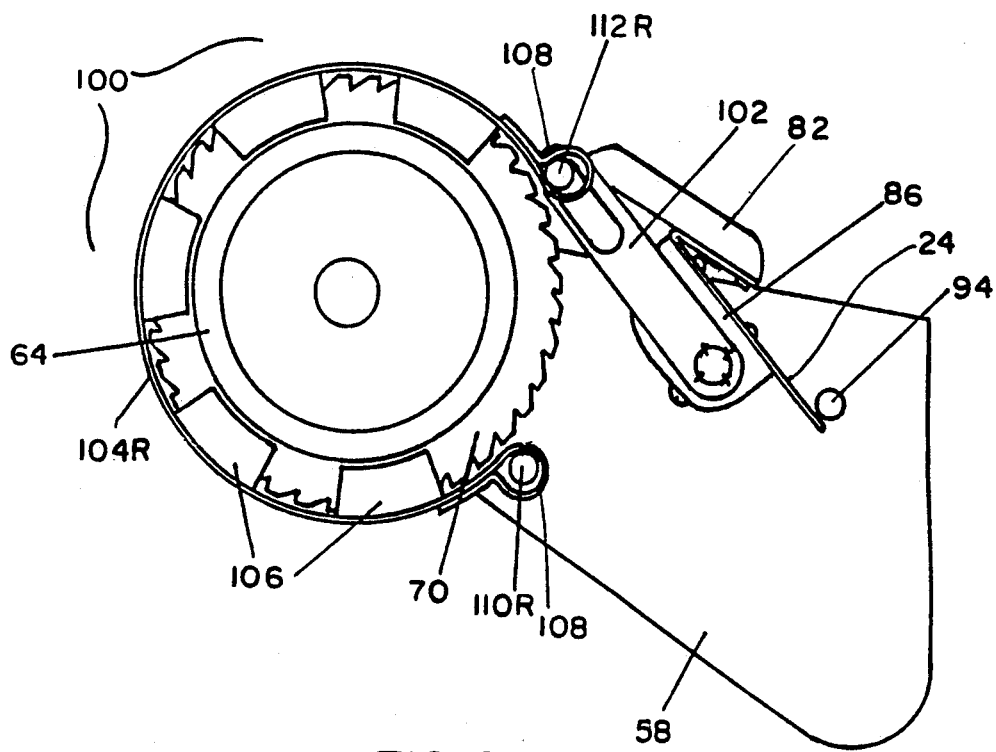
FIG. 16 is a right side elevational view of the right brake and ratchet assemblies.
Figure 17:
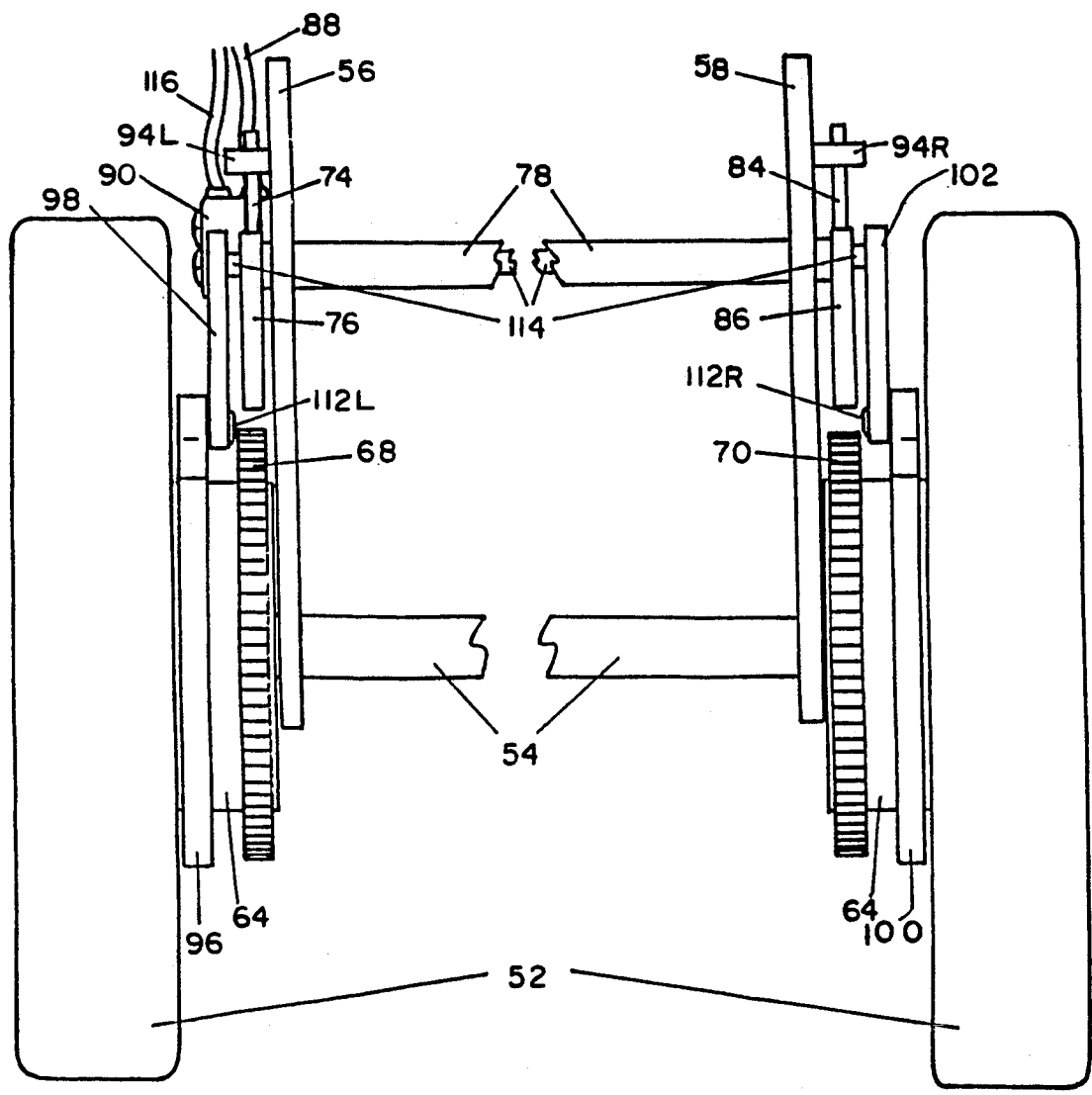
FIG. 17 is a top plan view of the left and right brake and ratchet assemblies.
Figure 18:
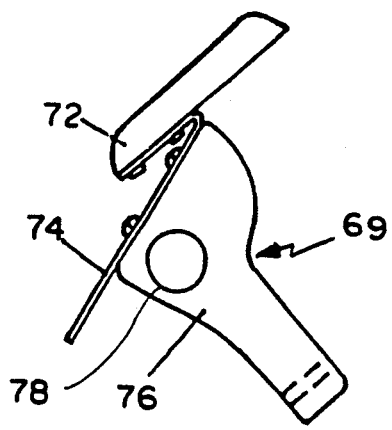
FIG. 18 is a side elevational view of the left ratchet actuator.

Referring now to FIGS. 9 and 10, the hand truck 14 of the instant invention comprises a hand truck frame 48 including an operator's handle 50 which extends upwardly at the upper end of the frame 48, and a lifting plate 51 which extends forwardly adjacent the bottom end thereof, and a pair of wheels 52 which are mounted on an axle 54 which extends through left and right wheel brackets 56 and 58, respectively, attached to the bottom side portions of the hand truck frame 48. The wheels 52 are illustrated in FIGS. 11 and 12, and each comprises a rubber tire 60, a sealed bearing 62 for mounting the wheel 52 on the axle 54, and a brake drum hub 64.

Figure 19:
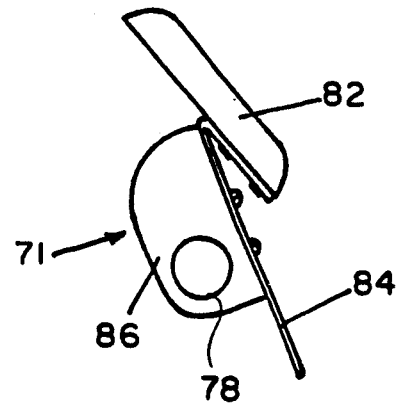
FIG. 19 is a side elevational view of the right ratchet follower.
Figure 20:
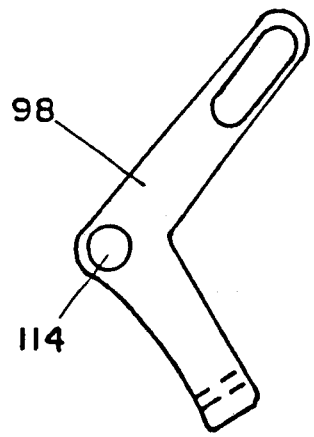
FIG. 20 is a side elevational view of the left brake actuator.

Referring to FIGS. 13 through 21, the hand truck 14 further comprises a unidirectional wheel control mechanism for selectively limiting the direction of rotation of the wheels 52 to a backward direction, and a brake system for locking the wheels 52 in stationary positions. The wheel control mechanism comprises a left ratchet wheel 68, a left pawl actuator 69 (FIG. 18), a right ratchet wheel 70, and a right pawl follower 71 (FIG. 19). The right and left ratchet wheels 68 and 70 are identical, and they are mounted on the inside edge portions of the left and right brake drum hubs 64 respectively, so that the ratchet teeth face inwardly toward the hand truck frame 48 on both the right and left sides thereof. The left pawl actuator 69 (FIG. 18) comprises a left ratchet pawl 72, a left pawl spring 74, and a left pawl pivot arm 76, which is attached in substantially perpendicular relation to one end of a ratchet control tube 78 (see FIGS. 10 and 17). The ratchet control tube 78 extends through the left wheel bracket 56, across the width of the hand truck frame 48, and through the right wheel bracket 58. The right ratchet follower 71 (FIG. 19) comprises a right ratchet pawl 82, a right pawl spring 84, and a right pawl pivot arm 86 which is attached in substantially perpendicular relation to the opposite end of the control tube 78 from the left pawl pivot arm 76 adjacent the left wheel bracket 56. A sheathed ratchet control cable 88 (see FIGS. 13 and 15) is attached to the left pawl pivot arm 76, and the cable 88 passes through a cable block 90 for maintaining the power end of the cable sheath in stationary relation to the frame 48. The sheathed cable 88 extends upwardly from the cable block 90 along the left side of the hand truck frame 48, where it is attached to a ratchet control lever 92 (see FIGS. 9 and 10).

The normal position of the ratchet control lever 92 is an upwardly extending "neutral" position wherein the ratchet pawls 72 and 82 are disengaged from the teeth of the ratchet wheels 68 and 70, respectively, so that the wheels 52 are freely rotatable in forward and reverse directions. When a hand truck operator moves the lever 92 downwardly to an engaged position (see broken lines in FIG. 9), the ratchet control cable 88 is retracted so that the left pawl pivot arm 76 pivots toward the left ratchet wheel 68 causing the left ratchet pawl 72 to engage the teeth of the left ratchet wheel 68. Further, the control tube 78 and the right pawl pivot arm 86 are pivoted causing the right ratchet pawl 82 to engage the teeth of the right ratchet wheel 70. Accordingly, when the control lever 92 is in the engaged position thereof the ratchet wheels 68 and 70, and therefore the hand truck wheels 52, are limited to unidirectional rotation wherein the hand truck 14 is only movable in a rearward direction. When the control lever 92 is the engaged position thereof, the left and right pawl springs 74 and 84, respectively, engage spring bars 94L and 94R (see FIGS. 13 through 17) which protrude inwardly from the left and right wheel brackets 56 and 58 for biasing the springs 74 and 84, so that they tend to return the control lever 92, the control tube 78, and both ratchet pawls 72 and 82 to their "neutral" disengaged positions.

Figure 21:
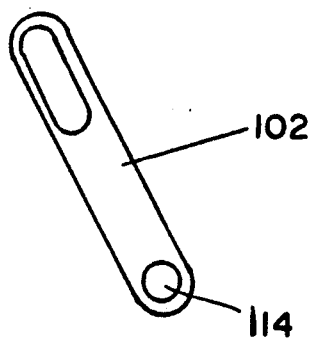
FIG. 21 is a side elevational view of the right brake follower.

The brake system comprises a left brake band 96 (see FIG. 15); a left brake actuator 98 (see FIG. 20), a right brake band 100 (see FIG. 16), and a right brake follower 102 (see FIG. 21). The left and right brake bands 96 and 100, respectively (see FIGS. 15 and 16), comprise spring bands 104L and 104R, respectively, and a plurality of brake pads 106 which are attached to the inside surfaces of the spring bands 104L and 104K. The spring bands 104L and 104R include mounting loops 108 at opposite ends thereof, and they extend between stationary brake pins 110L and 110R which extend outwardly from the left and right wheel brackets 56 and 58, respectively, and free-floating brake pins 112L and 112R. The brake bands 96 and 100 surround the brake drums 64 of the wheels so that the brake pads 106 are in close proximity to the surfaces of the drums 64. The free-floating brake pin 112L which extends through the loop 108 of the left brake band 96 is pivotally attached to one end of the left brake actuator 98, which is mounted in substantially perpendicular relation on one end of a brake control rod 114 (see FIG. 17). The brake control rod 114 extends from the outer side of the left wheel bracket 56, through the ratchet control tube 78, to the outer side of the right wheel bracket 58, where it is attached in substantially perpendicular relation to one end of the right brake follower 102. The other end of the right brake follower 102 is attached to the free-floating brake pin 112R which extends through the loop 108 in the spring band 104R of the right brake band 100. The opposite end of the left brake actuator 98 is attached to a sheathed brake cable 116 (see FIGS. 13 and 15) which passes through the cable block 90 for maintaining the sheath of the cable 116 in stationary relation to the frame 48. The sheathed cable 116 extends upwardly along the left side of the hand truck frame 48 where it is attached to a brake control lever 118 (see FIG. 10) mounted on the operator's handle 50. When the brake control lever 118 is squeezed toward the operator handle 50 (see arrow and dotted lines in FIG. 10), the brake cable 116 pulls on the lower end of the left brake actuator 98 causing it to rotate and pull downwardly on the free-floating brake pin 112L, thus drawing the left brake band 96 inwardly around the left brake drum 64, and forcing the brake pads 106 into contact with the left brake drum 64. In addition, rotation of the left brake actuator 98 rotates the brake control rod 114 which in turn rotates the right brake follower 102 drawing the right brake band 100 inwardly around the right brake drum 64. In this manner, both wheels 52 are braked simultaneously. Due to the resiliency of the spring bands 104L and 104R, the brake bands 96 and 100 are returned to their original non-braking positions when tension on the brake cable 116 is released.

For use of the system as illustrated in FIG. 1, the ramp 12 is positioned on a flight of stairs in the manner previously described. It is again pointed out that the ramp channels 18 rest on the apices of the individual stairs to help support the weight of the hand truck 14 as it is pulled upwardly over the stairs. The hand truck 14 is loaded with cargo and positioned at the lower end of the ramp 12 so that the wheels 52 align with the ramp channels 18. The ratchet control lever 92 is moved to the closed position which engages the left and right ratchet pawls 72 and 82, respectively, thus limiting the movement of the hand truck 14 to a backward direction. The operator of the hand truck 14 then ascends the flight of stairs one step at a time while pulling the hand truck 14 in a backward direction. Forward rolling of the hand truck 14 due to gravitational forces is prevented by the engaged ratchets and pawls of the wheel control system. It can be appreciated that the wheels 52 are, in effect, parked in the ramp channels 18 when the operator is not pulling upwardly on the hand truck. This allows a momentary and instantaneous rest, and it also allows the operator to reposition his/her feet on the steps between successive pulls. To pull the hand truck 14 the operator may position his/her feet side-by-side on each succeeding step, face directly toward the loaded hand truck, and lean backward while bending at the knees, thus performing a symmetrical lifting operation with the hand truck in line with the direction of the lift. In this manner, movement of the hand truck 14 up the ramp channels 18 is accomplished without significant strain on the lower back, and without jerking motions. Further, the pulling forces required to move a load are reduced as the hand truck wheels 52 easily roll in the ramp channels 18. Still further, the hand truck 14 can be lowered without requiring an operator to bend at the waist, thus allowing the operator to maintain a more erect posture, and significantly reducing intervertebral compression. In this regard, most of the forces necessary to lift or lower the hand truck are applied with the legs and therefore intervertebral forces, fatigue, high inertia forces, and overload are reduced, and asymmetrical lifting and partially flexed trunk posture are eliminated. In addition, the braking system can be utilized whenever and wherever necessary to prevent the hand truck from rolling either forward or backward when the hand truck is moved on an inclined surface.

It is seen therefore that the hand truck and ramp system of the instant invention provides an effective means for transporting heavy cargos up or down flights of stairs. The ramp and hand truck system of the instant invention reduces the effort necessary to lift cargos up stairs, and it promotes correct lifting posture, thus reducing the likelihood of both acute and cumulative lower back injuries as resulting from transporting cargos on hand trucks over stairs. For these reasons it is believed that the hand truck and ramp system of the instant invention represent significant advancements in the art which have substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In combination, a hand truck and ramp means receivable on an inclined flight of stairs having upper and lower stairs with generally horizontal upper surfaces and vertical risers, said hand truck comprising a hand truck frame having upper and lower ends and front and rear sides, and including a handle connected to and adjacent the upper end thereof, and a forwardly extending lifting plate connected to and adjacent the lower end thereof, laterally spaced apart wheel supporting brackets extending rearwardly from the lower end of said frame, an axle for said brackets, laterally spaced apart wheels, each having annular tires concentrically mounted on each wheel and the axle for rotatably supporting said hand truck frame for travel on said ramp means, and a ratchet means actuable for selectively limiting the rotation of said wheels to a rearward direction, said ramp means comprising upper and lower ramp track assemblies, each including telescoping track units with laterally spaced apart tracks, upper and lower footing members spanning said ramp tracks and pivotally connected for swinging movement relative to the upper and lower track units respectively about laterally extending axes, said upper footing member having a platform for engaging the upper surface of the upper stair and dependent flange means extending generally perpendicularly downwardly therefrom for engaging the vertical riser of the upper stair, the upper footing member being swingable relative to the upper track unit about a pivot axis extending through members which extend upwardly from the footing member, dependent on the inclination of the flight of stairs, the footing member engaging the platform with the upper surface of the upper stair while the dependent flange means facially engages with the vertical riser of the upper stair, said combination being operative for transporting a load of cargo up said flight of stairs wherein said hand truck is pulled in a rearward direction up said ramp means, said ratchet means preventing said hand truck from rolling in a forward direction down said ramp means.

2. In the combination of claim 1, said ratchet means comprising a ratchet wheel attached to one of said wheels, and a ratchet pawl attached to said hand truck frame adjacent said wheel, and a remote control means for selectively moving said ratchet pawl into operative engagement with said ratchet wheel.

3. In the combination of claim 1, said wheels comprising left and right wheels, said ratchet means comprising left and right ratchet wheels, respectively, attached to said left and right wheels, and left and right ratchet pawls, respectively, attached to said hand truck frame adjacent said left and right wheels for respectively engaging the teeth of said left and right ratchet wheels.

4. In the combination of claim 3, said hand truck having control means operable for actuating said left and right ratchet pawls into and out of engagement with said left and right ratchet wheels.

5. The combination of claim 2 wherein leaf spring means is connected to said pawl, and means fixed to said frame biases said leaf spring means when the pawl is moved into operative engagement with said ratchet wheel by said remote control means.

* * * * *